United States Patent [19]

Wells

[11] Patent Number: 5,322,388

[45] Date of Patent: Jun. 21, 1994

[54] TOXIC WASTE MONITORING AND COLLECTION DEVICE

[75] Inventor: Thomas L. Wells, Houston, Tex.

[73] Assignee: Randalette, Inc., Houston, Tex.

[21] Appl. No.: 870,572

[22] Filed: Apr. 17, 1992

[51] Int. Cl.$^5$ ............................................. E02B 15/04
[52] U.S. Cl. ..................................... 405/52; 166/265; 210/170; 210/242.4; 405/128
[58] Field of Search ..................... 588/249, 259, 260; 166/265; 210/170, 242.4, 924; 405/52, 128, 129

[56] References Cited

U.S. PATENT DOCUMENTS

| | | | |
|---|---|---|---|
| 2,523,091 | 9/1950 | Bruce | 166/265 X |
| 4,172,039 | 10/1979 | Akiyama | 210/242.4 X |
| 4,469,170 | 9/1984 | Farmer | 166/265 X |
| 4,663,037 | 5/1987 | Breslin | 210/170 |
| 4,872,994 | 10/1989 | Jakob | 210/242.4 X |
| 4,960,346 | 10/1990 | Tamayo | 405/52 |
| 5,116,163 | 5/1992 | Bernhardt | 405/128 |

Primary Examiner—David H. Corbin
Attorney, Agent, or Firm—D. Arlon Groves

[57] ABSTRACT

A device for monitoring and collecting toxic wastes in underground reservoirs, with no moving parts, is disclosed herein. A pollutant/water separator is supported interior to an outer chamber for protection which is ventilated for communication therethrough. The lower portion of such chamber forms a collection chamber for collected toxins to which still more chambers may be added in modular fashion for greater storage capacity and increased intervals between servicing. The ventilation array is preferably arranged so as to not to permit communication until the assembled device is weighted, and to retain a buoyancy chamber above such array so as to further support such device and to exclude water from the top of the separator without any mechanical seals. By elimination of hydrocarbon-based adhesives, proper selection of materials, and the use of triply-sealing mechanical connections, all chances for the monitoring device to contaminate pure wells and to cause false positive indications are eliminated.

13 Claims, 2 Drawing Sheets

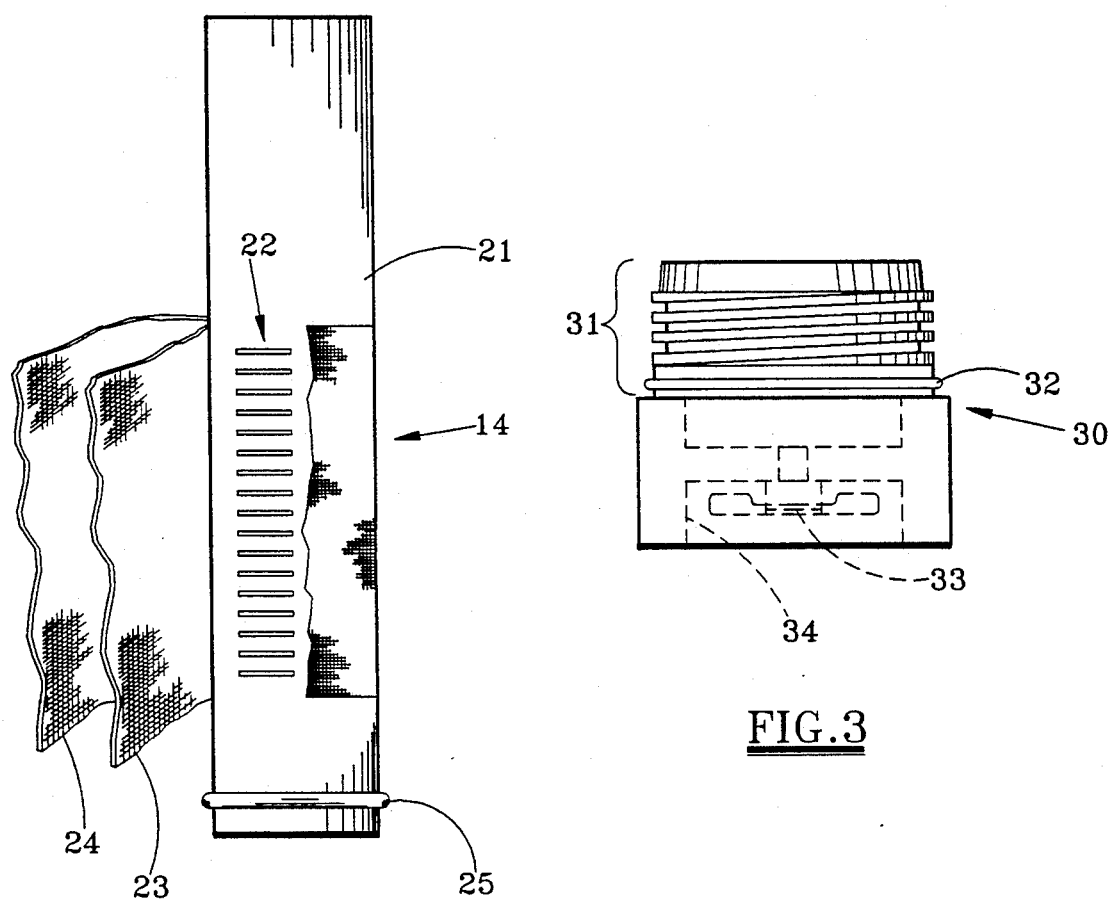

TOXIC WASTE MONITORING AND COLLECTION DEVICE

BACKGROUND OF THE INVENTION

This invention is of important beneficial effect to the environment and relates primarily to apparatus for detecting the presence of hydrocarbons in underground aquifer formations and for the removal of such hydrocarbons.

The convenience of modern-day life in America, with the proliferation of personal automobiles available to almost everyone, has not been achieved without cost. Accompanying the ubiquitousness of the automobile has been the development of a huge infrastructure to attend to the specialized needs of the automobile and the motoring public. This infrastructure—which comprises a significant portion of our gross national product—has produced fuel dispensing stations at almost every significant intersection and an entire industry to find, produce, refine, transport and store the hydrocarbon products which drive the industry. Unfortunately, as the industry has continued to expand and to accord even greater convenience to the public, the number of possible point sources of pollution has increased also.

These possible point sources of pollution are as varied as the industry, varying from individual service stations with leaking underground tanks and intermittant spillages from normal operations to large fuel depots, pipelines, pumping stations, refineries and other processing plants. In many cases, the pollution was eliminated at the source years ago, but even those former sources of pollution present a continuing hazard to the environment as the spilled hydrocarbons continue to work their way down through surface layers of soil into the aquifers below. Since a very small amount of such products can contaminate a large amount of ground water—it is estimated that less than one ounce of gasoline is sufficient to render a hundred thousand gallons of water unsafe for human consumption, for example—it is apparent that a considerable need exists for an accurate, economical and rapid means of monitoring the pollution rate of underground aquifers and for retrieving the pollutants once detected.

Most of the nation's two hundred thousand plus service stations are required to have what is known as monitoring wells near their possible sources of pollution. These typically are small-diameter wells which extend from an accessible surface location down to the water formation below. Various types of instruments are then lowered into the wells to detect the presence of polluting hydrocarbons, but most of such instruments are one of two general types, either of fixed flotation design or free floating.

Both designs typically comprise long thin cylinders with a perforation arrangement of some sort to allow the contaminants on the surface of the water to enter the cylinder. With the fixed flotation design, the instrument as a whole is intended to remain suspended at a constant height regardless of variations in water height. Typically in this class, the design is such as to permit an internal product collection head to float up or down within the fixed cylinder as the water level varies. Naturally, the maximum length of travel possible within a collection device of this type is limited by the length of the cylinder between the collection chamber and the head of the device which, under the best of conditions, may be as little as two feet. In use, however, the device is initially positioned in a well such that its floating product collection head may either rise or sink as the water level in the well rises or sinks. Thus, if the water level in a monitoring well employing a device of this type should drop by more than one foot, the level of pollutants on the surface of the water would be below the range permitting intake of the pollutants, and the device would simply cease to function. Similarly, should the water level rise by more than one foot, the pollutant level would be above the level which permits intake, and the device similarly would cease to function.

In practice, however, the real limits on permissable travel are even less than the design limits described above. All devices of this type known to applicant incorporate a coil of flexible tubing communicating between the floating collection head and the product collection chamber below which transmits the captured pollutants from the head to the collection chamber. All such coils to some extent function physically like a spring; they have a certain resistance to being extended, and to being compressed. In practice, as the water level drops, the weight of the floating product collection head interior to the device may not be sufficient to fully compress a tubing coil which may have taken a "set" at an extended position, and, therefore, the device may cease functioning with a drop in water level of even less than the design limit of one foot. Similarly, a tubing coil which has long been fully compressed before placement in a well may have a resistance to full extension greater than the slight upward force on the floating collection head provided by its force of buoyancy, and may thus similarly not be able to extend to its full design limit with a rise in the water level of the well. Further, such coils weaken and deteriorate with age, and frequently break, thereby transmitting the pollutants taken in by the floating head not to the collection chamber but only to that portion of the device between such chamber and the floating collection head. Since this portion of the device is in open communication with the surrounding well water, however, the pollutants taken in by the collection head are readily dispersed back to the well.

Still another defect, and an important one, in many such devices arsies from their designed dependence upon their ability to precisely position the floating collection head with regard to the water/pollutant level. This is to say that many devices of this type are not capable of excluding water from the collection head if the water level rises above the designed "float point" of the collection head. Not only will devices of this type cease functioning when the water level rises beyond the maximum permitted travel, but such devices will actually permit water to be taken in under these circumstances and displace previously collected pollutants from the collection chamber. Under such circumstances, then, such devices fail to serve any purpose whatsoever. Not only do they fail to collect any pollutants, but by giving a false indication of no pollutants could actually disguise the presence of severe pollution for an extended period of time with harmful consequences for the environment. Additionally, such devices require vent tubes to allow free movement of the floating collection head; when these tubes are not properly installed, as is often the case, water may enter through such tubes and drive out collected hydrocarbons.

The other general type of passive monitoring/recovery devices has its own set of limitations. In general, devices of this class are intended to float up and down in their entirety, rather than just one part within such devices. Devices of this class generally have a cylindrical recovery chamber surmounted by a fixed hydrocarbon/water separator fully exposed to its surroundings. A safety chain is normally attached to the top of the separator which both limits the downward permitted travel of the device and permits recovery from the well when desired.

Devices of this sort may have a permitted range of travel considerably greater than devices of the first type. These devices will continue to function so long as the water/pollutant interface is anywhere along the working length of the separator. However, travel distance is achieved by continuing to pay out free length of chain into the well after the device has reached its floation level. Since chains are notoriously not buoyant, the freedom to travel downward—which is achieved only by the additional lengths of chain beyond the buoyant point—imposes a considerable limit on the freedom to travel upwards. The extra lengths of chain may be thought of as a loop of chain from the top of the device down to the bottom of the loop and then back up to the surface, a portion of which tends to weight down the device. Thus the amount of surplus chain that initially can be provided is limited to that which would weight down the separator below the water level. However, not even that amount can actually be used since no upward movement at all would be achieved: a rising water level would result in even more slack water chain and even more weight to drag down the floating device. Thus in practice such devices are actually able to achieve little more than 2 or 3 feet of vertical movement from an initial floating position. Since a large number of monitoring wells are shallow, their water levels can and do change considerably, with the result that such travel limitations are significant in their effect on the operational useful of such devices and on the environment.

The hydrocarbon/water separators of most such devices typically comprise a perforated polyvinylchloride tube with an inner filter normally consisting of a hydrophobic membrane and an outer filter consisting of a hydrocarbon-attractive media. Such filters are normally glued securely to the polyvinylchloride tube to insure that no water seeps into the tube around the edges of the filters. However, the hydrocarbon base of such glues tends to leach out into the well water, thereby giving false indications of pollutants even when no pollutants are present. Such false positives can cause remedial actions and their attendant costs in both time and money to be incurred needlessly.

In addition, the typical prior art collection/monitoring device utilizes a ball or other valve at the bottom of the collection chamber for emptying the collected pollutants at the surface for proper disposal. Since a filled or nearly-filled device is both heavy and wet, and often has an oily film thereon as well, it is frequently dropped when not intended and the collected pollutants are often accidently discharged at the surface, thereby starting the pollution cycle over from the beginning.

OBJECTS OF THE INVENTION

It is therefore a principal object of the present invention to provide a monitor/collector device that will not permit the unintentional discharge of collected pollutants.

It is another object of the present invention to provide a monitoring device incapable of providing false indications of pollutants.

It is yet another object to provide a monitoring/collecting device which will remain functional at several times the vertical water level displacement of prior art devices.

It is still another object to provide a collecting device with a much enlarged storage capacity to lengthen the intervals between necessary servicing.

It is a further object to provide a monitoring device which will readily prevent cross-contamination when a previously-used device is moved to a different location.

It is yet another object to provide a device rugged enough to withstand the normal mishaps when such devices are handled in the field.

SUMMARY OF THE INVENTION

A preferred embodiment of the present invention will perform several functions simultaneously. Since more and more women are entering the environmental field, it will preferably be light enough even when full to be retrieved from a monitoring well by a woman of average strength. It will not permit captured hydrocarbons to be displaced from the storage chamber if submerged, and it will continue to operate through a wide range of changes in water level. In addition, it will have no complicated connections of any type which can possibly be mis-connected by field personnel, and will be rugged enough to withstand the typical handling of such personnel.

A preferred embodiment of the present invention may be utilized both to monitor wells for the presence of hydrocarbons or other pollutants and to collect such hydrocarbons or other pollutants for subsequent removal, without any moving parts whatsoever. Greater ruggedness to withstand field handling is obtained by situating the hydrocarbon/water separator interior to the body of the detector-collector, with ports or perforations therein permitting communication between such separator and the well fluids. Other means for protecting the separator are equally functional, but this arrangement is preferred. The provision of purely mechanical connections between the various parts of the body proper permits lightweight, economical body parts to be used without utilizing hydrocarbon-based adhesives, thus preventing leaching of hydrocarbons and eliminating a source of 'false positive' indications. Triple seals may be obtained at all mechanical interconnections by the employment of flush-joint threads and an "O"-ring gasket.

A preferred separator is formed of a thin cylindrical tube with an array of perforations along the walls which preferably stop some distance from each end. The separator is preferably supported near each end by a stabilizer interior to the upper portion of the body proper. If desired, threads could be provided on each end of the separator and within each stablizer, but this degree of securing has not been found necessary. Rather, it has been found sufficient simply to have the stabilizers and separator sized so as to provide a snug fit, with a suitable gasket means such as an "O"-ring seal or the like for each end to provide a water tight seal. Alternatively, the need for an upper seal may be eliminated by providing a buoyancy chamber at the top of the collector body. If the material from which the separator tube is formed is chosen from that class of materials bondable with non-hydrocarbon-based adhesives, a hydrophobic membrane may be securely attached thereto by such adhesives, thereby eliminating a source of false positives common to the prior art.

Within wide limits, the body of the monitor-collector may be as long as desired. Due to the modular nature of the preferred embodiment, the only limitations on length are the practical limitations such as fluid depth within a well and the amount of force available to retrieve a filled collector. If it is desired to be able to pull up a filled device by hand without any mechanical advantage such as pulleys, cranks, or the like, this will impose a first limitation on overall weight; if it is desired for the filled device to be light enough for a woman of average strength to be able to retrieve the filled device directly, then this will impose another limitation. Possibly subject to these practical limitations, the collector can be as long as desired simply by adding additional sections.

For all lengths, it is preferred that the bottom valve for discharge of collected contents be recessed within the lowest section to avoid both accidental opening of the valve and breakage of the valve mechanism. The latter becomes of greater concern with increasing length, and hence weight, of a filled collector.

The array of perforations on the upper body is preferably proportioned such that an assembled but empty monitor-collector may achieve an initial buoyancy point higher than the level required to permit fluid communication through such perforations. A stablizer may be formed of a suitable weighting material to initially position an empty collector at the desired level; the additional buoyancy of additional sections may be compensated for by the placement of additional weights down a cable securing the top of the assembled device. A collector so emplaced may rise a considerable distance with a rising water level before the weight of the slack cable prevents it from rising further. Similarly, if slack cable is initially paid into the well, such a collector may descend a considerable distance with a falling water level before a tight cable prevents further descent. Normally, enough slack cable will be paid into a well to allow the collector to descend the full length of the perforation array as the collector fills with product. In any event, the preferred embodiment does not permit water to enter the collection chamber and drive out collected product, even if fully submerged.

BRIEF DESCRIPTION OF THE DRAWINGS

FIG. 2 is an isometric view of a preferred form of construction of a separator, shown at an intermediate stage of construction for clarity.

FIG. 3 is an isometric view of an optional end assembly for the present invention, with recessed valve means depicted by hidden lines thereon.

DETAILED DESCRIPTION OF THE PREFERRED EMBODIMENT

Figure 1:
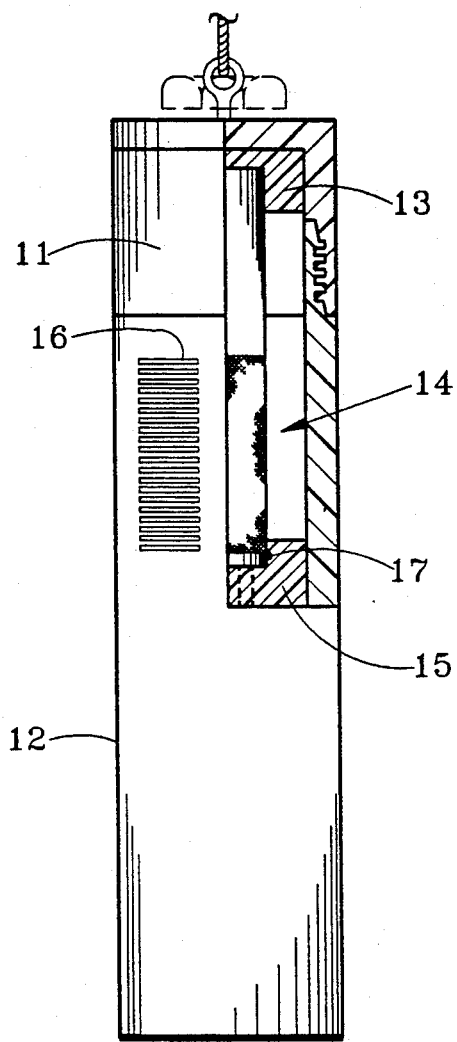
FIG. 1 is a partial isometric, partial cross-section view of the upper portion of one preferred embodiment.

FIG. 1 is a partial isometric, partial cross-sectional view of the upper portion of one preferred embodiment of the present invention. For ease of manufacture and assembly, it is preferred for such upper member 10 to comprise a separate cap assembly 11 and a hollow member 12 which most conveniently may be cylindrical in shape. The upper end of such cap assembly 11 will preferably include means such as an eye bolt or the like for attachment to a safety cable. Interior to such cap assembly, preferably, is an upper stabilizer 13 for the hydrocarbon/water separator 14. Such upper stablizer could be positioned within hollow member 12, but it has been found both more convenient and more economical to situate such stablizer within upper cap assembly 11.

As shown by the cut-out portion of FIG. 1, the lower end of hydrocarbon/water separator 14 is also supported by a stabilizer, lower stablizer 15. In the most preferred embodiment, this stabilizer may conveniently perform an additional function as explained below. The first function of such stabilizers, however, is to support separator 14 adequately from impact such as that caused by knocking the device over while on the surface, etc. As shown by the isometric portion of FIG. 1, there is an array of perforations 16, in this instance slots, in upper member 12 which when in use will permit fluid to communicate with separator 14. Preferably, such perforations are also present on other circumferential portions of upper member 12 so that pollutants may enter from any direction.

While any suitable hydrocarbon/water separator may be employed, it is preferred to utilize a separator which may be easily replaced. Since an interior filter would require difficult to achieve internal seals to each end, an exterior filter arrangement is preferred. As may best be seen from FIG. 2, separator 14 preferably consists of an inner tube 21 with an array of perforations 22 and a hydrophobic filter 23 and a hydrocarbon attractive filter 24. Such hydrophobic filter media 23 and 24 are preferably wrapped continuously around cylinder 21 and secured water-tight at both upper and lower edges and along the length of its vertical edge. Common clamps could be utilized to secure the upper and lower ends, but unless an expensive pre-manufactured cylindrical filter media is used, a vertical edge requiring sealing would still remain. Such a vertical edge may conveniently be sealed by gluing the overlapping portions securely; a non-hydrocarbon based glue will eliminate 'false positive' readings due to the phenomenon of leaching. If any gluing is to be done, it is convenient similarly to glue the top and bottom edges of the media as well. If a non-hydrocarbon based glue is utilized, then cylinder 21 must be selected from those materials to which such adhesives will bond. Preferably, such material will also not rust or corrode rapidly in the intended environment. Materials such as aluminum and stainless steel have been found to meet these competing criteria.

The completed separator 14 communicates through lower stabilizer 15 to the chamber partially formed by the lower portion of hollow member 12. Both the upper and lower ends of tube 21 need to be water-tight within their respective stabilizers; this may conveniently be effected for the lower end by means of an O-ring seal 25 in groove 17 of the lower stablizer. While a similar O-ring seal may be provided for the upper end as well, it is not necessary so to do, as will be explained later.

The modular design of the preferred apparatus permits a range of capacities to be offered to the user. For the lowest capacity needed, a bottom assembly 30 may be secured to upper member 10, thereby completing one such apparatus. Use of flush-joint threads 31 and another O-ring seal 32 will provide a triple mechanical seal which simultaneously will permit the ready assembly-disassembly and the enlargement or reduction of capacity as needed. For use in a 4-inch diameter well, an overall length of less than 3 feet may provide a half gallon of storage capacity.

Figure 4:
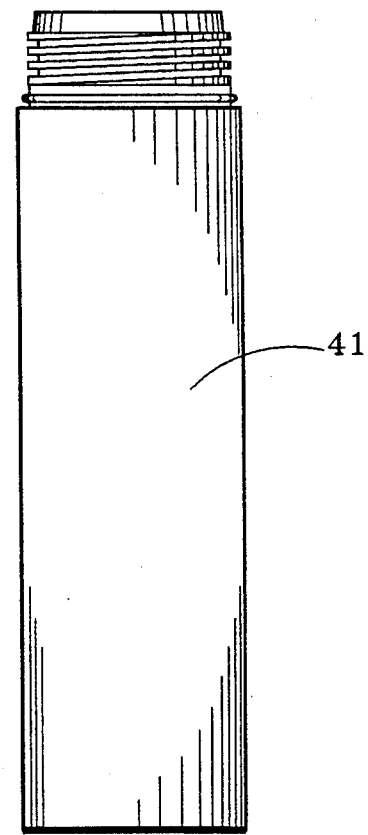
FIG. 4 is an isometric view of a modular section which may be added to increase the storage capacity of the assembled monitor-collector.

For installations in which larger capacity may be desired, the addition of a first modular storage section 41 as shown in FIG. 4 may easily add another gallon of storage capacity such that a total of a gallon and a half can be easily obtained from a total length of under six feet. Still more such sections may be added as needed. In any event, a preferred arrangement for the discharge valve 33 is within a recess 34 of either lower end assembly 30 or the lower end of a last section such as section 41 of FIG. 4.

One skilled in the art will appreciate that what has been described herein is a modular apparatus with no moving parts and having neither vent tube nor coiled tubing. However, from the foregoing description alone, one of ordinary skill in the art may well doubt the operability of such a device.

The discerning artisan may observe that a device such as described herein would be extremely buoyant when empty, and may doubt that the array of perforations in upper member 10 would even contact the pollutant/water interface, particularly when additional sections are added. In actual use, applicant expects to find little if any need for a 4-inch model with only a half-gallon of storage capacity; applicant expects that at least one additional storage unit will be needed for virtually all 4-inch monitor wells. The extreme buoyancy of such an assembly may be partially overcome by constructing lower stabilizer 15 out of a dense material to partially weight down the assembly. Preferably, this internal weight is chosen so as to just immerse the bottom perforations of upper member 10 with one full-length storage unit when immersed in fresh water. The additional buoyancy forces of additional sections may be conveniently overcome by adding additional weights to the top of the unit over the connecting cable; such additional weights may be both secured by such cable and positioned so as to not possibly interfere with operations. It is also to be noted that the additional bouyancy forces of saline wells may similarly be compensated for.

In use, then, the apparatus of the present invention will be lowered into a well weighted correspondingly to the number of storage units selected and resulting buoyancy forces so that the lowest perforations are just immersed below the surface. The level of water in the well may rise, with the unit rising with it, until the weight of the extra cable prevents the unit from rising farther, a considerable distance, indeed. If the water level is anticipated to drop, additional cable may initially be payed out, and the unit will automatically be lowered along with the fall of the water level until the end of the cable is reached. Thus an extremely wide variation in water table level may be accommodated initially.

As the collection chamber begins to fill, the unit will lose buoyancy and begin to seek a lower level with respect to the surface of the water. This process will continue until the earlier of one of two events occurs. If only a short additional amount of cable was paid out initially, the sinking of the unit will be halted by the cable, at a level which will permit the unit to continue operating until full. By not extending the array of perforations in upper member 10 to near the top of such member, an air cap or bubble will be trapped within the unit whenever it should be submerged beyond the topmost perforation. This trapped air bubble will thus provide a lower limit to the buoyancy of the overall unit, and may also prevent the unit from sinking below a desired level. This buoyancy chamber will also serve to exclude fluids from the top of the separator, thereby eliminating the need for a sealing mechanism at the top portion of such separator. Due to the unique design of applicant's invention, no trapped hydrocarbons will be forced out even if a unit of this design should be completely submerged for an extended period of time.

Other alternate forms of the present invention will suggest themselves from a consideration of the articles and principles hereinbefore discussed. Accordingly, it should be clearly understood that the systems and techniques depicted in the accompanying drawings and described in the foregoing explanations are intended as exemplary embodiments of the invention and not as limitations thereto.

What is claimed is:

1. A passive well-monitoring collecting device with no moving parts, comprising:
   an upper body with means for securing a generally elongated hydrocarbon-water separator at an upper portion and a lower portion thereof and interior to said upper body, said lower securing means further comprising a water-tight seal with said separator, said upper body further providing means for fluid external to said body to communicate with said separator interior to said body;
   a lower body for storing hydrocarbons separated by such separator and communicating with the lower portions of said upper body;
   mechanically connectable means for sealing said upper body and said lower body;
   means connected to said lower body for discharging collected product therefrom; and
   means connected to said upper body for raising and lowering said device.

2. The device of claim 1, wherein said securing means further comprises a circumferential seal exterior to said separator and interior to said securing means.

3. The device of claim 1, said securing means further comprising mechanically-removable securing means.

4. The device of claim 1, wherein said separator further comprises a generally elongated tube formed of material from the class of materials bondable with non-hydrocarbon-based adhesives, and further contains an array of perforations in the walls thereof for communicating with said fluids.

5. The device of claim 1, said communicating means of said upper body being arranged in proportion to buoyancy forces on said upper and said lower body such that said fluids will not communicate therewith when said device is in an unweighted state.

6. The device of claim 1, further comprising means for weighting said device such that only a lower portion of said communicating means will communicate with said fluids when empty.

7. The device of claim 6, wherein said weighting means further comprises at least one of said securing means.

8. The device of claim 1, wherein said raising and lowering means further comprises means for adding weights to said device.

9. The device of claim 1, wherein said discharging means further comprises valve means recessed within said lower body, whereby the unintentional discharge of collected product may be avoided.

10. The device of claim 1, wherein said upper body further comprises a buoyancy chamber therein.

11. The device of claim 1, said upper body further comprising an end cap assembly mechanically removable from said upper body.

12. The device of claim 11, said end cap assembly further comprising means for securing an upper portion of said separator.

13. A passive well-monitoring collecting device with no moving parts, comprising:

an upper body portion with means for securing a generally elongated hydrocarbon-water separator at an upper portion and a lower portion thereof and interior to said upper body portion, said lower securing means further comprising a water-tight seal with said separator, said upper body portion further providing means for fluids external to said body to communicate with said separator interior to said body portion;

a lower body portion for storing hydrocarbons separated by such separator and integral with said upper body portion;

means connected to said lower body portion for discharging collected product therefrom; and means connected to said upper body portion for raising and lowering said device.

* * * * *